(No Model.)  3 Sheets—Sheet 1.

E. GRAY.
ELECTRIC MOTOR.

No. 452,429. Patented May 19, 1891.

Attest
Geo. H. Botts
J. H. Palmer

Inventor
Elisha Gray
by Philip A... ...
Attys (No Model.) 3 Sheets—Sheet 2.

E. GRAY.
ELECTRIC MOTOR.

No. 452,429. Patented May 19, 1891.

Attest:
Geo. H. Sotts.
T. H. Palmer.

Inventor:
Elisha Gray
by Philipp, Phelps & Hovey
Attys (No Model.) 3 Sheets—Sheet 3.
E. GRAY.
ELECTRIC MOTOR.
No. 452,429. Patented May 19, 1891.
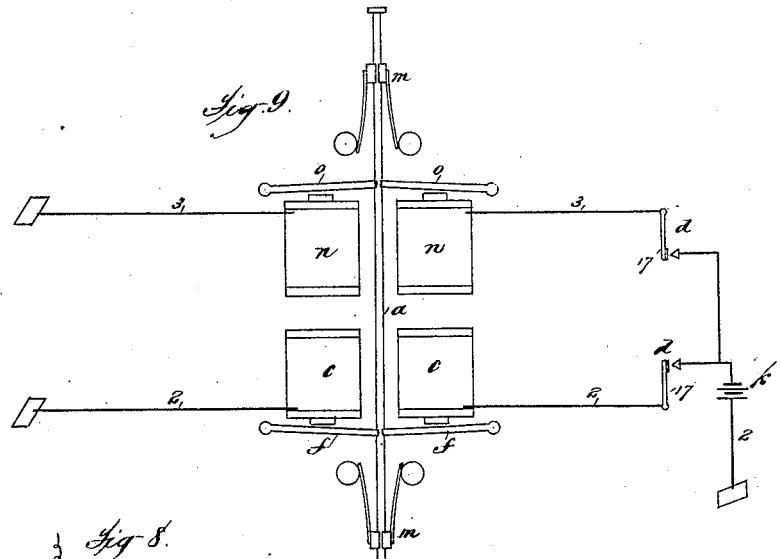
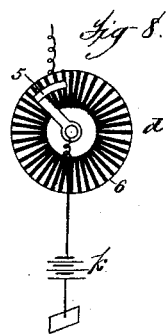
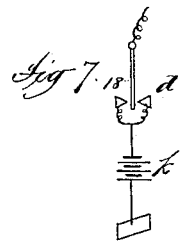
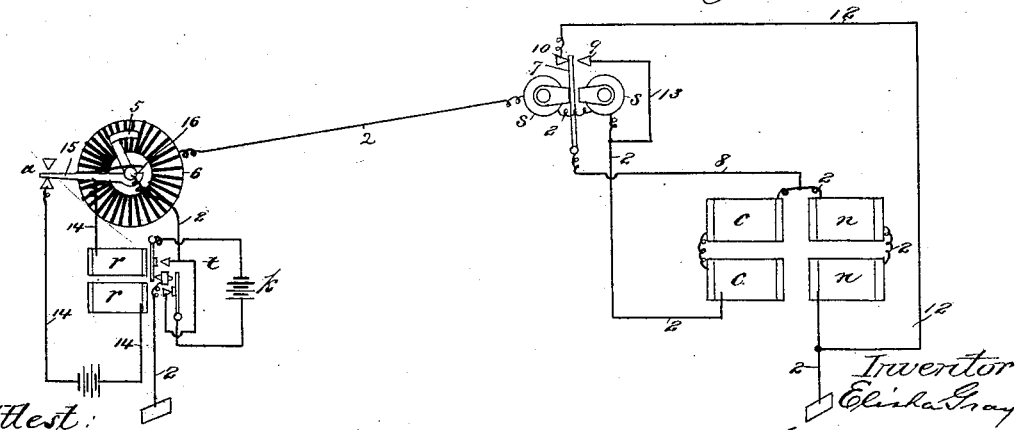
Attest:
Geo. H. Botts.
J. H. Palmer
Inventor
Elisha Gray
by Philipp Philipp Harry
Attys

UNITED STATES PATENT OFFICE.

ELISHA GRAY, OF HIGHLAND PARK, ILLINOIS.

ELECTRIC MOTOR.

SPECIFICATION forming part of Letters Patent No. 452,429, dated May 19, 1891.

Application filed July 3, 1888. Serial No. 278,895. (No model.)

*To all whom it may concern:*

Be it known that I, ELISHA GRAY, a citizen of the United States, residing at Highland Park, county of Lake, and State of Illinois, have invented certain new and useful Improvements in Electric Motors, fully described and represented in the following specification and the accompanying drawings, forming a part of the same.

This invention relates to an electric motor which, although capable of general application, is especially adapted for use in connection with the receiving or reproducing pen of a telautograph system, such as shown and described in my companion applications for Letters Patent filed May 31 and June 13, 1888, Serial Nos. 275,593 and 276,921.

The motor constituting the present invention is constructed and organized to operate by means of impulses passing over an electric circuit, and is especially adapted for producing an interrupted or step-by-step movement, which may be either rotary or rectilinear and either continuously in one direction or reversible. The electric impulses for operating the motor are produced by making and breaking or interrupting the current passing over an electric circuit, so as to successively energize and de-energize an electro magnet or magnets, and this may be effected by any suitable form of interrupter or circuit maker and breaker operated either by hand or mechanically or electrically.

As a full understanding of the invention can only be given by an illustration and a detailed description of a motor constructed and organized according to the invention, all further preliminary description will be omitted and a full description given, reference being had to the accompanying drawings, in which—

Figure 1:
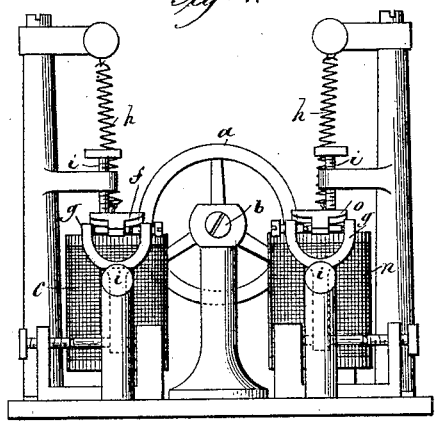
Figure 2:
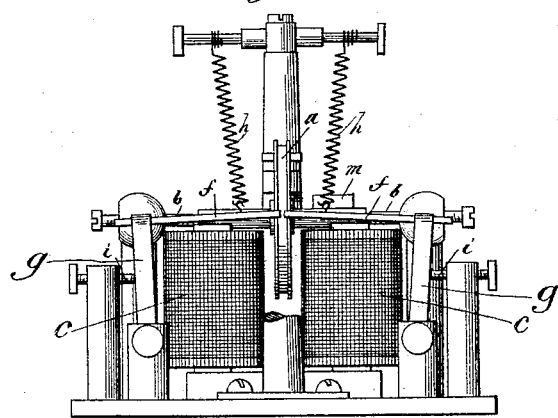
Figure 3:
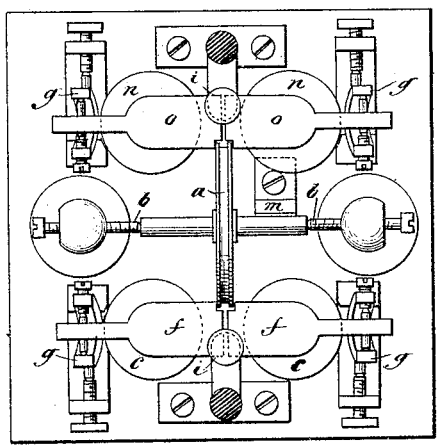
Figure 4:
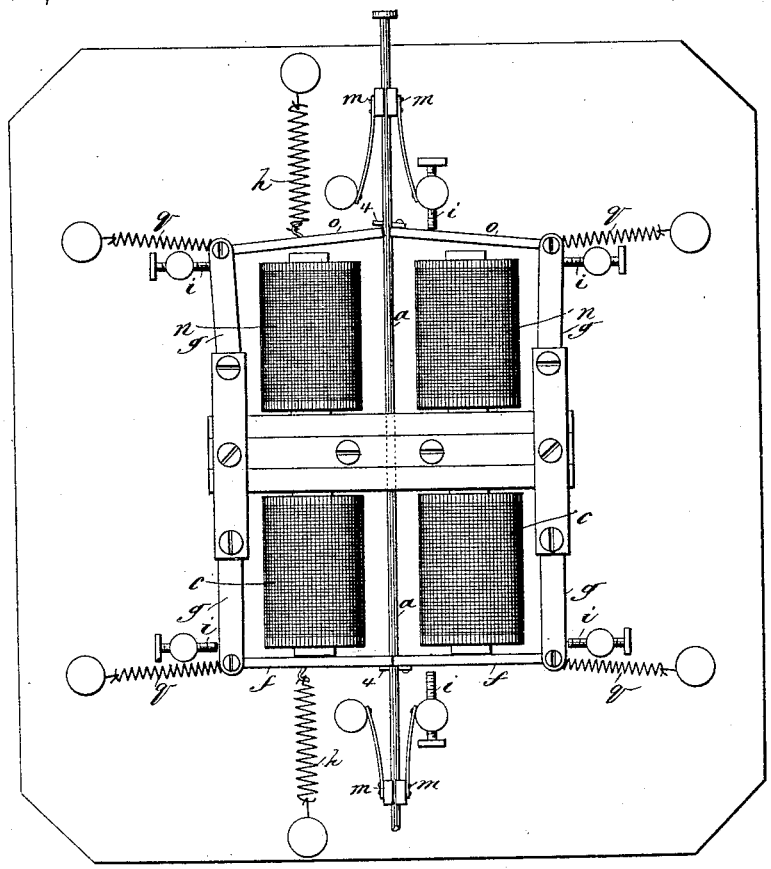
Figure 5:
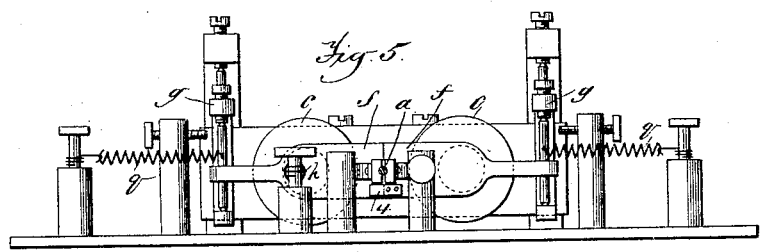

Figure 1 is a side elevation of a rotary motor embodying the invention. Fig. 2 is an end elevation of the same, certain parts being broken away. Fig. 3 is a plan view of the same, partly in section. Fig. 4 is a plan view of a reciprocating motor embodying the invention. Fig. 5 is an end and Fig. 6 a side elevation of the same. Figs. 7 and 8 illustrate different forms of interrupters or circuit making and breaking devices. Figs. 9 and 10 are diagrams illustrating the electrical connections. These connections are shown in the diagrams as applied to the reciprocating form of the motor; but the connections for the rotary form are exactly the same, and the description of the connections is therefore to be understood as applying to both forms.

Referring to Figs. 1, 2, and 3, it is to be understood that the motor consists, primarily, of a motor-magnet $c$, which is included in an electric circuit 2, (see Fig. 9,) which also includes an interrupter $d$, and is provided with an armature $f$, which is divided at its middle so as to form two parts, the adjacent ends of which act upon the driver $a$ of the motor from which the motion is taken. The opposite or outer ends of the two parts of the armature are pivoted to swinging frame-pieces $g$ in such manner that the two parts of the armature are capable of vibrating to and from the poles of the magnet, and also of moving laterally to and from the sides of the driver $a$. The two parts of the armature are provided with springs or other retractiles $h$, the tendency of which is to hold the parts in their withdrawn position away from both the magnet and the driver, the movement of the parts in these directions being limited by suitable backstops $i$. The retractiles $h$ are so adjusted that whenever the magnet $c$ is energized the two parts of the armature $f$ will first be drawn toward each other, so as to grip the driver $a$ between them, and will then be drawn toward the magnet, and thus impart a movement to the driver. If the motor is of the rotary form, as shown in Figs. 1, 2, and 3, the driver $a$ will be in the form of a wheel, which may be mounted to turn on suitable bearings $b$, as shown.

The operation of the motor thus organized is as follows: The circuit 2, being supplied with suitable battery or other source of electricity, as indicated at $k$, and the interrupter $d$, which, as indicated in Fig. 9, is a simple key or push-button 17, being operated to close the circuit, the magnet $c$ will be energized. As soon as the magnet is energized the two parts of the armature will be magnetized and will be drawn together, so as to grip the wheel $a$, and the energy of the magnet will then move the armature so as to move the wheel a step. As soon as the current over the circuit is interrupted by the action of the interrupter the magnet will be de-energized and the parts of the armature will be restored to their normal position by the springs or other retractiles $h$, and so the operation will be repeated at each interruption of the current, and the wheel will be rotated with a step-by-step movement. The rapidity of the movement of the wheel will depend upon the frequency of the interruptions in the current, and by this means the speed of wheel and any part or parts driven thereby can be regulated at pleasure. The retrograde movement of the motor-wheel when it is released by the armature may be prevented by a suitable friction device, as $m$, arranged to act upon the wheel or its shaft.

If it is desired to make the motor reversible, it may be provided with a second reversely-arranged motor-magnet $n$, similar to the magnet $c$, and having an armature $o$, similar to the armature $f$, and arranged to act upon the wheel $a$ to revolve it in the reverse direction. The magnet $n$ may be included in a second electric circuit 3, having a similar interrupter $d$ for controlling the circuit. By operating the interrupters of the respective circuits the motor can be reversed as frequently as may be desired.

Figure 6:
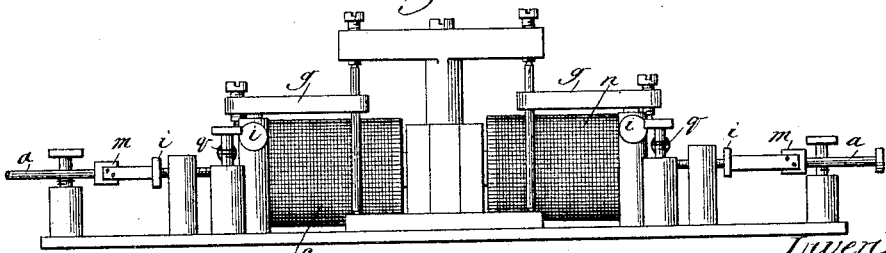

If it should be wished to organize the motor to produce a rectilinear instead of a rotary motion, the driver $a$ may be developed or extended into the form of a rod and the motor-magnets and armatures correspondingly arranged, as shown in Figs. 4, 5, and 6. In this case the operation will be exactly the same, except that the driver will be reciprocated in a reverse direction as the respective interrupters are operated. As shown in Figs. 4, 5, and 6, each of the armatures is provided with three retractiles $h\ q$, one for drawing the two parts of the armatures away from the magnets and two for drawing the two parts from each other. The springs $h$ are connected to one part of each armature, and the other part is provided with a lip 4, of non-magnetic material, which projects over the part to which the spring is connected, so that the two parts move together. In this case the friction device $m$ acts upon the rod $a$. In this case, also, one of the armatures is shown in the position which it will occupy when its magnet is energized.

The interrupter or means for making and breaking the electric circuit or circuits may be any form of device which circumstances may require and which will operate to make and break or interrupt the current sufficiently to cause the magnets to operate. It may be a simple key or push-button 17, as indicated in Fig. 9, or may be a vibrator 18, which swings to and from a contact-point or between contact-points, as indicated in Fig. 7, or it may be a so-called "sunflower," constructed to repeatedly interrupt the current by continued movement in the same direction, as shown in Fig. 8. Such an interrupter consists of a brush or contact-spring 5, to which one wire of the circuit is connected, and which is arranged to sweep over the face of a disk or plate 6, to which the other wire of the circuit is connected, the face of the disk being provided with a series of slots or recesses which contain pieces of insulating material, so that as the brush sweeps over the disk the circuit is repeatedly made and broken or interrupted, thus energizing and de-energizing the motor-magnet in rapid succession.

When the motor is of the reversible type, it will frequently be desirable to energize and de-energize both of the motor-magnets by means of the same circuit and interrupter. One means for accomplishing this is illustrated in Fig. 10. For this purpose the circuit 2 includes both of the motor-magnets $c\ n$, and also the magnet $s$ of a polarized relay, the polarized armature of which is connected by a wire 8 to the circuit between the motor-magnets and vibrates between contact-points 9 10, which are respectively connected by wires 12 13 to the circuit at a point beyond the motor-magnets and at a point between the relay and the motor-magnets. The circuit 2 is also provided with an ordinary pole-changer $t$, which is connected to the terminals of the battery $k$ and to the circuit in the usual and well-known manner, so that as its armature-lever is rocked by the energizing and de-energizing of its magnet $r$ the polarity of the current will be changed. The magnet $r$ is included in a local circuit 14, which also includes a circuit maker and breaker $u$, which is operated in any suitable manner to change the condition of the circuit 14 whenever it is desired to operate the pole-changer and reverse the movement of the motor. As herein shown, the circuit maker and breaker consists of an arm 15, which is included in the circuit and vibrates between stops, one of which is also included in the circuit. The arm 15 is frictionally connected to the shaft 16, which carries the brush 5 in such manner that so long as the shaft and brush continue to move in one direction the arm will remain against one or the other of the stops and the condition of the local circuit 14 will remain unchanged and the pole-changer will not act to change the polarity of the current over the circuit 2. As soon, however, as the movement of the brush 5 is reversed the arm will be vibrated from one stop to the other, thereby changing the condition of the circuit 14 and operating the pole-changer to change the polarity of the current over the circuit 2. The relay $s$ is so arranged that so long as the current passing over the circuit is of one polarity the polarized armature 7 will remain in contact with one of its contact-points (10, for example) and the current will pass through the motor-magnet $c$ and over the wire 8, armature-lever 7, and wire 12, thereby short-circuiting the motor-magnet $n$ and energizing and de-energizing the motor-magnet $c$ as the circuit is made and interrupted by the interrupter. As soon, however, as the polarity of the current over the circuit 2 is changed by the reversal of the brush 5 of the interrupter the armature-lever 7 of the relay will be vibrated into contact with the point 9, and the current over the circuit will pass over the wire 13, armature-lever 7, and wire 8 and through the motor-magnet $n$, thereby short-circuiting the motor-magnet $c$ and reversing the motor, and this action will take place as frequently as the movement of the brush 5 is reversed.

The interrupter or interrupters may be operated in any suitable manner either by hand or electrically or mechanically, as circumstances and the use to which the motor is applied may require. If the interrupter is operated with sufficient rapidity, which may be readily done by the employment of electrical or mechanical devices for operating it, the successive steps of the motor may be taken in such quick succession as to make the movement of the motor in either direction practically continuous.

What I claim is—

1. The combination, with an electro-magnet, of an armature for said magnet, made in two parts, each part being flexible at two points, so that the parts may move to and from each other and to and from the magnet, substantially as described.

2. The combination, with an electro-magnet, of an armature for said magnet, made in two parts, each part being flexible at two points, so that the parts may move to and from each other and to and from the magnet, and a driver acted on by said armature, substantially as described.

3. The combination, with an electric circuit including an electro-magnet and an interrupter, of an armature for said magnet, made in two parts mounted to move to and from each other and to and from the magnet, and a driver acted on by said armature, substantially as described.

4. The combination, with an electro-magnet, of an armature for said magnet, made in two parts, each of said parts being mounted so that it may swing upon a swinging frame-piece, whereby the said two parts may move to and from each other and to and from the magnet, substantially as set forth.

5. The combination, with two electro-magnets, of armatures for said magnets, each made in two parts mounted to move to and from each other and to and from their respective magnets, and a driver acted on in reverse directions by said armatures, substantially as described.

6. The combination, with an electric circuit including two electro-magnets, a pole-changer, and a polarized relay connected to short-circuit one or the other of said magnets, according to the polarity of the current over the circuit, of armatures for said magnets, each made in two parts mounted to move to and from each other and to and from their respective magnets, and a driver acted on in reverse directions by said armatures, substantially as described.

In testimony whereof I have hereunto set my hand in the presence of two subscribing witnesses.

ELISHA GRAY.

Witnesses:
DAVID M. ERSKINE, Jr.,
J. M. POULTON.